US012694040B1

(12) United States Patent
Zeng et al.

(10) Patent No.: US 12,694,040 B1
(45) Date of Patent: Jul. 28, 2026

(54) ASYNCHRONOUS DATABASE STORAGE OPERATIONS

(71) Applicant: Amazon Technologies, Inc., Seattle, WA (US)

(72) Inventors: Lei Zeng, Irvine, CA (US); Alexandre Olegovich Verbitski, Woodinville, WA (US); Jing Zhou, Sunnyvale, CA (US); Edward Paul Murray, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/852,864

(22) Filed: Jun. 29, 2022

(51) Int. Cl.
G06F 16/27 (2019.01)
G06F 16/215 (2019.01)
G06F 16/22 (2019.01)

(52) U.S. Cl.
CPC .......... G06F 16/273 (2019.01); G06F 16/215 (2019.01); G06F 16/2282 (2019.01)

(58) Field of Classification Search
CPC ..................................................... G06F 16/273
USPC .......................................................... 707/613
See application file for complete search history.

(56) References Cited

U.S. PATENT DOCUMENTS

| | | | | |
|---|---|---|---|---|
| 5,758,351 | A * | 5/1998 | Gibson | .................... G06F 9/465 |
| 10,885,023 | B1 * | 1/2021 | Gupta | ................... G06F 3/0613 |
| 2002/0032692 | A1 * | 3/2002 | Suzuki | ................... G06Q 10/10 |
| 2003/0135850 | A1 * | 7/2003 | Miloushev | ................ G06F 8/70 |
| | | | | 717/165 |
| 2014/0195567 | A1 * | 7/2014 | Julien | ................... G06F 16/217 |
| | | | | 707/812 |
| 2017/0097768 | A1 * | 4/2017 | Craddock | ............. G06F 13/423 |
| 2017/0099145 | A1 * | 4/2017 | Craddock | ............. H04L 9/3242 |
| 2018/0081687 | A1 * | 3/2018 | Mahurin | ............. G06F 9/30043 |
| 2018/0150540 | A1 * | 5/2018 | Florendo | ............. G06F 16/273 |
| 2020/0341762 | A1 * | 10/2020 | Ramesh | ............. G06F 9/30014 |
| 2021/0240698 | A1 * | 8/2021 | Pocock | ............. G06F 16/2379 |
| 2022/0006706 | A1 * | 1/2022 | Patodia | ................. H04L 67/101 |

* cited by examiner

*Primary Examiner* — Muluemebet Gurmu
(74) *Attorney, Agent, or Firm* — Davis Wright Tremaine LLP

(57) ABSTRACT

A database system performs a data definition operation comprising at least a first sub-operation performed synchronously and a second sub-operation performed asynchronously. The synchronous sub-operation comprises modification of a database structure, and the asynchronous sub-operation comprises configuration of storage associated with the database structure. A response to the data definition operation is provided synchronously after the synchronous sub-operation is completed, without waiting for completion of the asynchronous sub-operation.

20 Claims, 9 Drawing Sheets

100 client
102 data definition
request
106 synchronous
response
108 asynchronous
response
110 database engine
114 interface
112 storage engine
116

database engine receives data definition request
202 async enabled?
204 yes no database engine updates data dictionary and in-memory data structures
210 send storage configuration request
212 storage engine performs storage configuration
216 storage agent monitors status
218 database engine updates schema and in-memory data structures
206 storage engine performs storage configuration operations
208 database engine responds to DDL request
214 client receives notification(s)
220

FIG. 2

500 receive a request to perform a data-definition operation          502 determine that a portion of the operation should be performed asynchronously          504 synchronously perform a first portion of the operation          506 request asynchronous completion of a second portion of the operation          508 provide synchronous notification          510 provide asynchronous notification(s)          512

600 update database schema          602 update in-memory data structures          604 determine resources to be configured synchronously          606 request asynchronous configuration of resources not configured synchronously          608 begin monitoring asynchronous sub-operation(s)          610

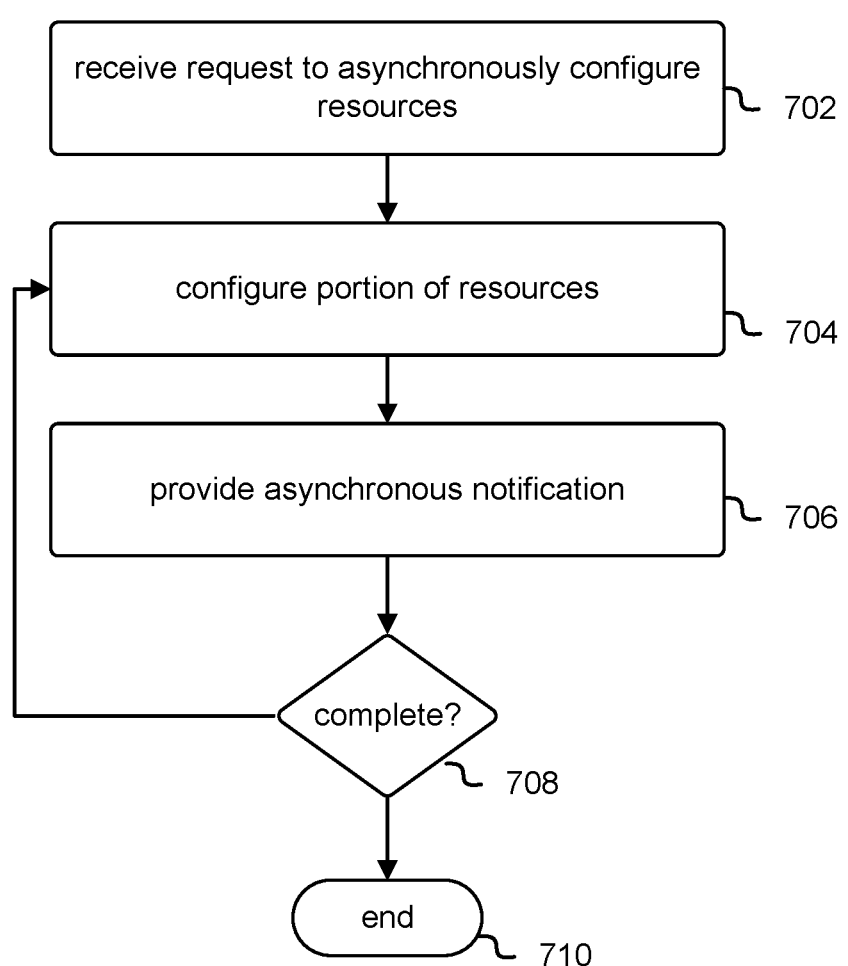
700
receive request to asynchronously configure resources — 702
configure portion of resources — 704
provide asynchronous notification — 706
complete? — 708
end — 710
FIG. 7

800

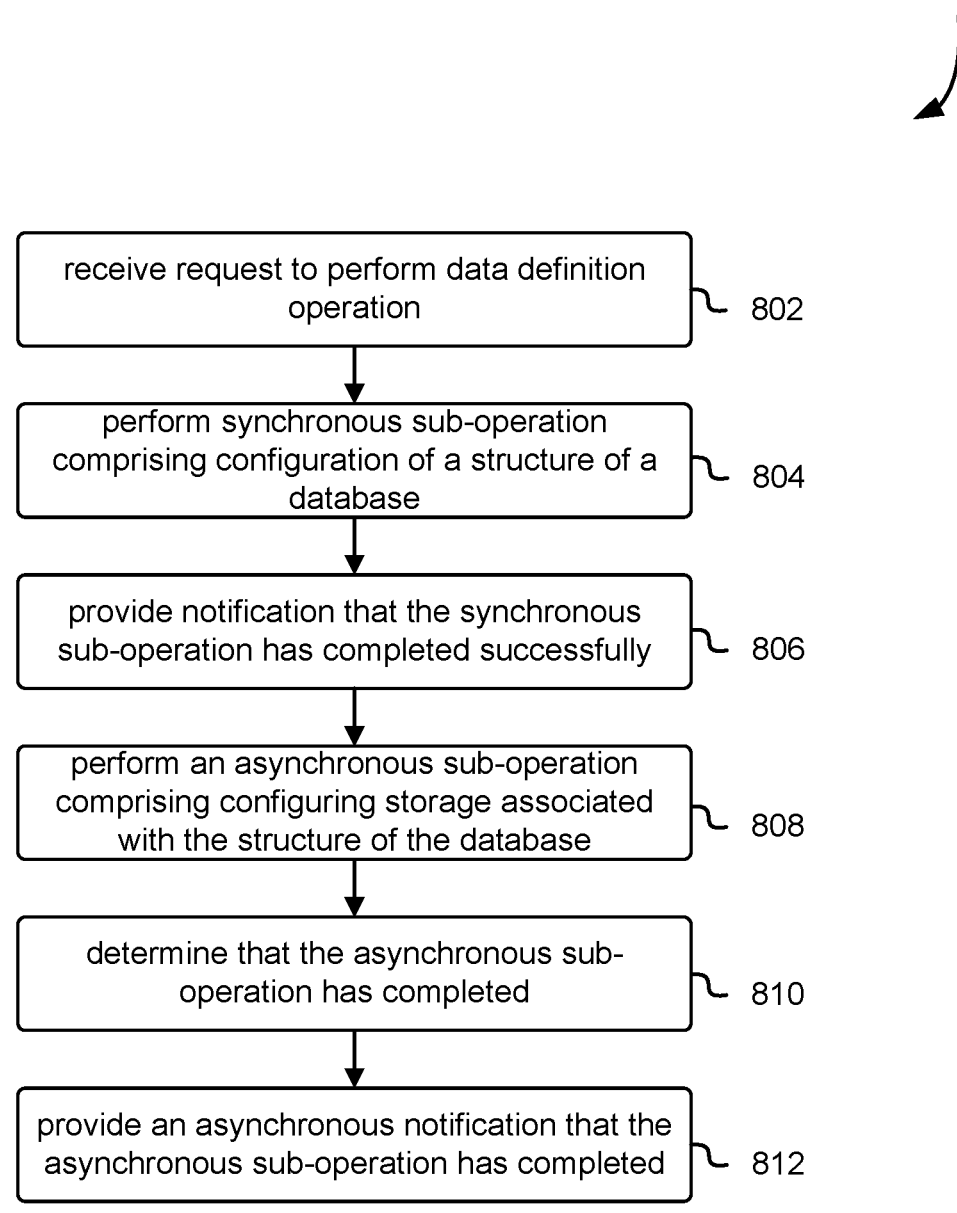

receive request to perform data definition operation ⌐ 802 perform synchronous sub-operation comprising configuration of a structure of a database ⌐ 804 provide notification that the synchronous sub-operation has completed successfully ⌐ 806 perform an asynchronous sub-operation comprising configuring storage associated with the structure of the database ⌐ 808 determine that the asynchronous sub-operation has completed ⌐ 810 provide an asynchronous notification that the asynchronous sub-operation has completed ⌐ 812

900 application
server(s)

906 web
server(s)

908 storage
engine database
engine

910

912

914 network

ASYNCHRONOUS DATABASE STORAGE OPERATIONS

BACKGROUND

Database systems provide support for data definition operations to create database structures such as tables, indexes, and views. These operations may involve the allocation or deallocation of storage capacity, as well as other operations related to the use of such space by the database system. These operations may take considerable time, and are prone to failure for various reasons.

BRIEF DESCRIPTION OF THE DRAWINGS

Various techniques will be described with reference to the drawings, in which:

FIG. 2 illustrates an example process of performing a data definition operation, in accordance with at least one embodiment;

FIG. 7 illustrates an example of asynchronous processing of resource configuration, in accordance with at least one embodiment;

FIG. 8 illustrates an example of processing a data definition operation, in accordance with at least one embodiment.

DETAILED DESCRIPTION

In an example, a database system receives a request to perform a data definition operation, such as creating a table, from a client. The database system comprises a database engine that processes queries, and a storage engine that manages storage used by the database system to store data, such as the rows of a table. The database system performs the data definition operation using stages, or sub-operations. One sub-operation is performed synchronously, and the other performed asynchronously. The synchronous sub-operation may comprise the database engine modifying a database structure such as a table, and can for example include modifying the definition of the table in a data dictionary. The asynchronous sub-operations can comprise longer-running operations, such as allocating storage space for a table, and may be performed by the storage engine.

In the example, the database system responds to the client after the completion of the synchronous sub-operation. The asynchronous sub-operation may be completed later, and the client may either receive a notification, query for the status of the asynchronous operation, or operate under an assumption that the asynchronous operation will eventually succeed and proceed without checking.

Embodiments of the example may, in some circumstances, provide increased reliability and flexibility compared to databases that implement data definition operations without using synchronous and asynchronous stages. For example, by performing longer-running storage-related operations in the asynchronous stage, potentially after the initial synchronous stage has completed, a client of the database may proceed with other actions without having to wait. In some cases and embodiments, the client may be able to proceed with using the database structure affected by the data definition operation after the synchronous stage has completed, irrespective of the completion of the asynchronous stage.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
FIG. 1 illustrates an example database system in which a data definition operation is performed using synchronous and asynchronous sub-operations, in accordance with at least one embodiment.

FIG. 1 illustrates an example database system 100 in which a data definition operation is performed using synchronous and asynchronous sub-operations, in accordance with at least one embodiment. In the example database system 100, a client 102 sends a request 106 to perform a data definition operation. The request 106 is processed by the database system 100 which, in at least one embodiment, comprises a database engine 114 and storage engine 116.

A data definition operation refers to any of a variety of operations to create, modify, or delete a database structure. Examples of database structures may include, but are not limited to, tables, indexes, views, stored procedures, multidimensional arrays or cubes for data analytics, and so forth.

A request to perform a data definition operation may be communicated to a database system, such as the depicted database system 100, in any of a variety of ways, including but not limited to the use of programmatic interfaces or communications protocols. A data definition operation may be expressed, in some embodiments, as a command in a data definition language ("DDL"). Data definition operations are sometimes referred to as DDL commands. Examples of DDL statements or DDL commands may include, but are not limited, to structured query language ("SQL") statements such as CREATE TABLE, ALTER TABLE, and DELETE TABLE. It will be appreciated that these examples are intended to be illustrative rather than limiting.

A database engine 114 comprises code and/or circuitry to perform or facilitate the performing of various database operations, such as those related to creating, reading, updating, and deleting data, as well as DDL operations to define the database structures that may be used in conjunction with these operations. The database engine 114 may be implemented on a variety of hardware components, potentially including but not limited to personal computers, servers, smartphones, tablets, embedded systems, and so forth.

In some embodiments, the database engine 114 comprises code and/or circuitry to interface with a storage engine 116 to perform storage configuration sub-operations asynchronously, as part of a DDL operation.

A storage engine 116 comprises code and/or circuitry to perform or facilitate the provision of suitable storage capacity, and potentially other storage-related operations. The storage engine 116 may be implemented on a variety of hardware components, potentially including but not limited to personal computers, servers, smartphones, tablets, embedded systems, and so forth. In some embodiments, the storage engine 116 may reside on the same hardware or set of hardware as the database engine 114. In other embodiments, the storage engine 116 resides on separate hardware. In at least one embodiment, the storage engine 116 resides on hardware that is remote to the database engine 114. For example, the storage engine 116 might be implemented at least in part by a cloud-based service provider, and be separated from the storage engine 116 by a network.

Storage can include any of a variety of computer readable-memories, such as dynamic random access memory ("DRAM"), mechanical disk drives, optical disk drives, solid-state disk drives, tape drives, and so forth. It will be appreciated that these examples are intended to be illustrative rather than limiting.

Storage configuration can include any of various operations associated with the management of storage capacity. This may include, but is not limited to, the provision of storage to be used to store database tables, views, indexes, and so forth. For example, to implement a DDL operation to create a table, the storage engine 116 may obtain a suitable amount of storage space on a storage device, format the storage space, and provide the database engine 114 with access to the formatted storage space. It will be appreciated that this example is intended to be illustrative rather than limiting. In at least one embodiment, some or all of these storage-related operations are performed asynchronously.

As used herein, synchronous refers to sub-operations performed during the immediate processing of a request to perform an operation. Here, immediate refers to what occurs prior to the initial response to the request. For example, client 102 may transmit request 106 to the database system 100, where it is processed by the database engine 114. The database engine 114 may perform various operations, which may be described as synchronous operations or synchronously performed operations, prior to returning a synchronous response 108. The synchronous response indicates that the request 106 has completed except for one or more additional operations to be performed asynchronously.

In at least one embodiment, the database engine 114 communicates with the storage engine 116 via an interface 112. The interface 112 may comprise software and/or circuitry on any of a variety of computing devices, including but not limited to personal computers, servers, smartphones, tablets, embedded systems, and so forth. In at least one embodiment, the interface 112 comprises an application programming interface. In another embodiment, the interface 112 comprises a protocol to facilitate communication with the storage engine 116. The database system 100 may be implemented to have distinct separation between operations that may generally be performed synchronously and those for which it is beneficial to perform asynchronously. The interface 112 may represent this division between the two layers. In some embodiments, the interface 112 is integrated into either or both of the database engine 114 and the storage engine 116. In some embodiments, the storage engine 116 provides services not specifically adapted to database operation, or only generally adapted, while the database engine 114 implements database-specific aspects such as formatting, compacting, and so on. However, in other embodiments, some database-specific aspects may be implemented by the storage engine 116.

In at least one embodiment, the storage engine 116 performs asynchronous sub-operations, such as configuring storage, associated with performing a DDL operation. The storage engine 116 may then provide asynchronous response 110 to the client 102 when those asynchronous operations are complete. Note that some embodiments may omit the provision of an asynchronous response 110. In such cases, the client 102 might poll for a result of an asynchronous operation, or assume that the operation succeeds without checking.

As used herein, asynchronous refers to sub-operations performed either after the immediate processing of a request to perform an operation, e.g., after the synchronous response 108, or independently of any synchronous sub-operations. An asynchronous operation, or an operation performed asynchronously, may therefore complete at any time, often after synchronous sub-operations have completed. Notification of the completion of an asynchronous sub-operation, or a determination that an asynchronous sub-operation has completed, is independent of the response to the synchronous portions of the operation.

Embodiments may employ similar approaches to asynchronously configure other resource types, including but not limited to compute capacity and network bandwidth.

FIG. 2 illustrates an example process of performing a data definition operation, in accordance with at least one embodiment. Note that although the example 200 depicts elements arranged in a specific order, embodiments may incorporate aspects of example 200 that combine, reorder, perform in parallel, or omit certain elements, except where explicitly indicated or logically required, such as when the input to one operation depends upon the input of another operation.

Embodiments of the example may be incorporated into a database system, such as the database system depicted in FIG. 1. Embodiments of the example may be implemented using software and/or circuitry, on any of various devices including but not limited to personal computers, servers, smartphones, tablets, embedded systems, and so forth.

At 202, a database system receives a data definition request. The data definition request may correspond, for example, to the request 104 depicted in FIG. 1, and may take the form, in at least one embodiment, of a DDL command in SQL. The database system may correspond to the database system 100 depicted in FIG. 1.

At 204, the database system determines that asynchronous operations are enabled for DDL operations. For example, some database systems may incorporate extensions to DDL command syntax to allow for aspects of the DDL command, such as storage allocation, to be performed asynchronously. In at least one embodiment, the database system may provide for configuration or administrative options to enable or disable asynchronous performance of DDL commands. Still other embodiments may always use asynchronous performance, in which case element 204 may be omitted.

If asynchronous operation is not enabled, the database engine of a database system may respond to the request by updating, at 206, a schema, sometimes referred to as a data dictionary, and any in-memory data structures, in accordance with the DDL command. The database engine may then request that the storage engine, at 208, synchronously perform storage configuration operations. A schema, or data dictionary, refers to a definition of a database structure such as a table, index, or view. For example, a schema of a table might include data defining the names of columns make up the table, what the data type of those columns is, what constraints are imposed on data stored in the table, and so on. The schema can also include data defining aspects of the tables storage, such as a maximum or expected number of rows, the techniques to be used to store the data (such as whether the data will be stored in row-major or column-major format, for example), whether portions of the data are to be stored using encryption, and so forth. The database system may use this data for a variety of purposes, including to allocate storage for the table. Changes to the schema of the database may, in various circumstances, require changes to the underlying storage for the impacted data structures. When asynchronous operation is disabled, the database system may perform these operations synchronously, but many of these operations involve considerable latency, or may be prone to failure, especially when additional storage capacity is not available. The database system may then, at 214, respond to the request. Since all aspects of the request were performed synchronously, the data definition operation is at this point complete, and the client receives a notification at 220.

However, if asynchronous operation is enabled, the database engine may, at 210, update the schema and any in-memory data structures, similar to what was done at 206 in the other branch of execution. However, at 212, the database engine sends a request to the storage engine to asynchronously perform storage configuration, rather than having the operations performed synchronously. The database system may then respond to the request at 214, and the client receives a notification at 220. However, at this point not all aspects of the data definition operation may have completed. The remaining portions of the operation are performed asynchronously.

In at least one embodiment, some schema changes may be performed asynchronously. For example, a table that is being created or modified by a data definition operation might be given a temporary name during the synchronous phase and renamed when its related storage operations have been completed asynchronously. A similar approach might be used for a table that is being deleted, for example by hiding or renaming the table during the synchronous stage and deleting the table from the schema when the operation has completed asynchronously.

Continuing the asynchronous-enabled case, a storage agent at 218 may monitor the status of the storage configuration operations being performed by the storage engine at 216. When these are complete, the storage agent may send a notification to be received by the client, as depicted by element 220. In some cases and embodiments, multiple agents similar to the depicted storage agent 218 may be used.

Figure 3:
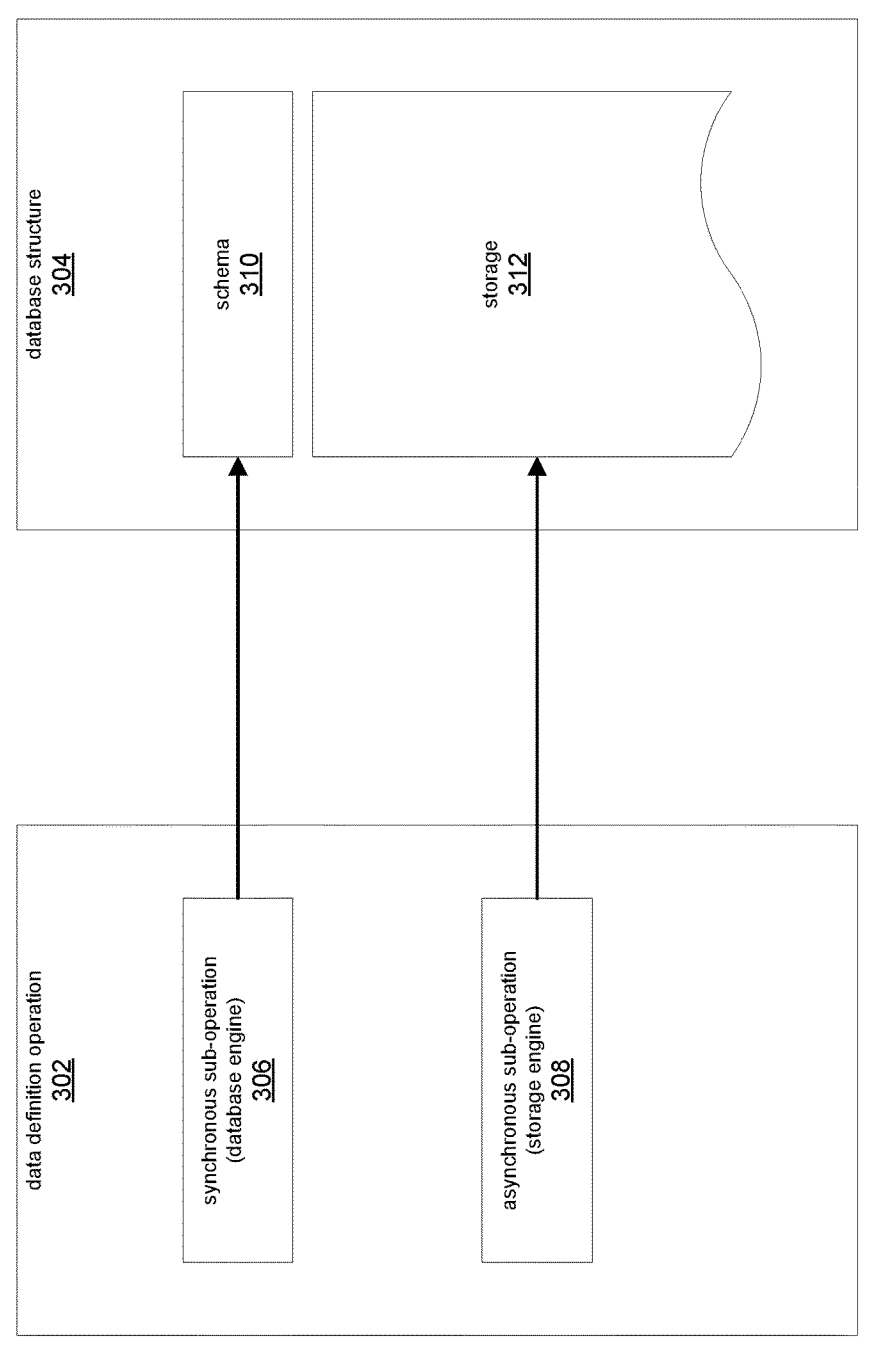
FIG. 3 illustrates an example of performing synchronous and asynchronous portions of a data definition operation, in accordance with at least one embodiment.

FIG. 3 illustrates an example of performing synchronous and asynchronous portions of a data definition operation, in accordance with at least one embodiment. As depicted in the example 300, a data definition operation may comprise two sub-operations, a synchronous sub-operation 306 that is performed primarily by a database engine, and an asynchronous sub-operation 308 that is performed primarily by a storage engine. The synchronous sub-operation 306 modifies aspects of a database structure 304 such as schema 310, and the asynchronous sub-operation 308 modifies storage 312.

In at least one embodiment, aspects of the data definition operation 302 are performed synchronously if they may complete within a threshold amount of time, when they are deemed unlikely to fail except in unusual situations, or when predicted error modes might be addressed through intervention but might not render the affected database structure 304 unusable. For example, a request to allocate additional storage capacity to a table might not affect the table's immediate operation, as long as the additional storage capacity is added before the table is full. Such a request might also fail during synchronous execution if there isn't sufficient underlying space on the system's storage device. Asynchronous execution of this portion of the request might permit the request to be completed after a long delay, after additional space is made available.

Figure 4:
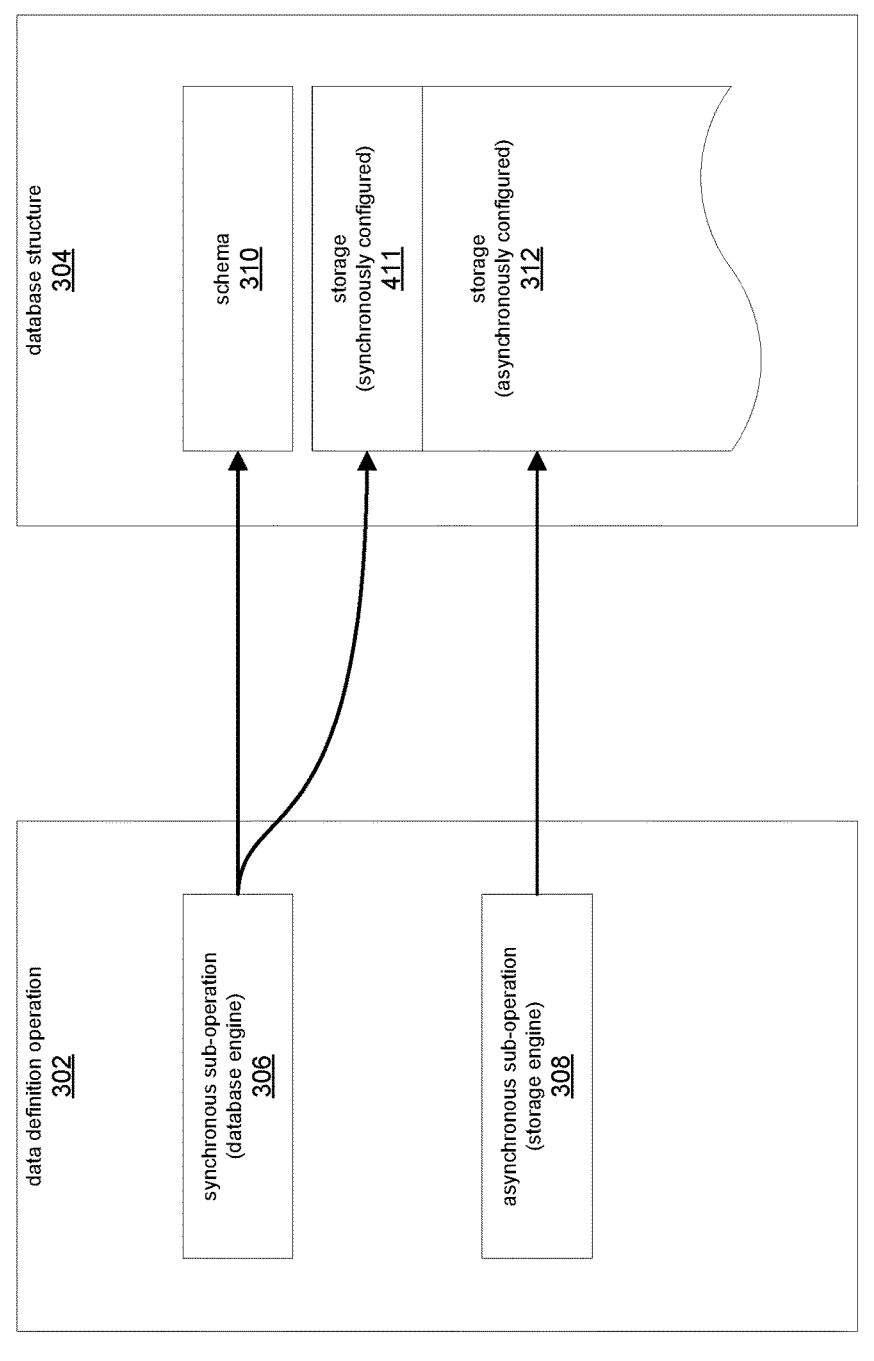
FIG. 4 illustrates an example of performing a portion of storage configuration synchronously and a portion of storage configuration asynchronously, in accordance with at least one embodiment.

FIG. 4 illustrates an example 400 of performing a portion of storage configuration synchronously and a portion of storage configuration asynchronously, in accordance with at least one embodiment. Similar to FIG. 3, aspects of the data definition operation 302 are performed in a synchronous sub-operation 306, and additional aspects are performed in an asynchronous sub-operation 308. This includes synchronous modification to the database structure's 304 schema 310 and asynchronous modification of the storage 312. However, some portion of the storage 411 is modified synchronously, by the synchronous sub-operation 306. For example, a request to allocate a table with a terabyte of storage space might be completed in stages, for example by allocating the first 25% of storage space synchronously and the remaining 75% asynchronously.

Figure 5:
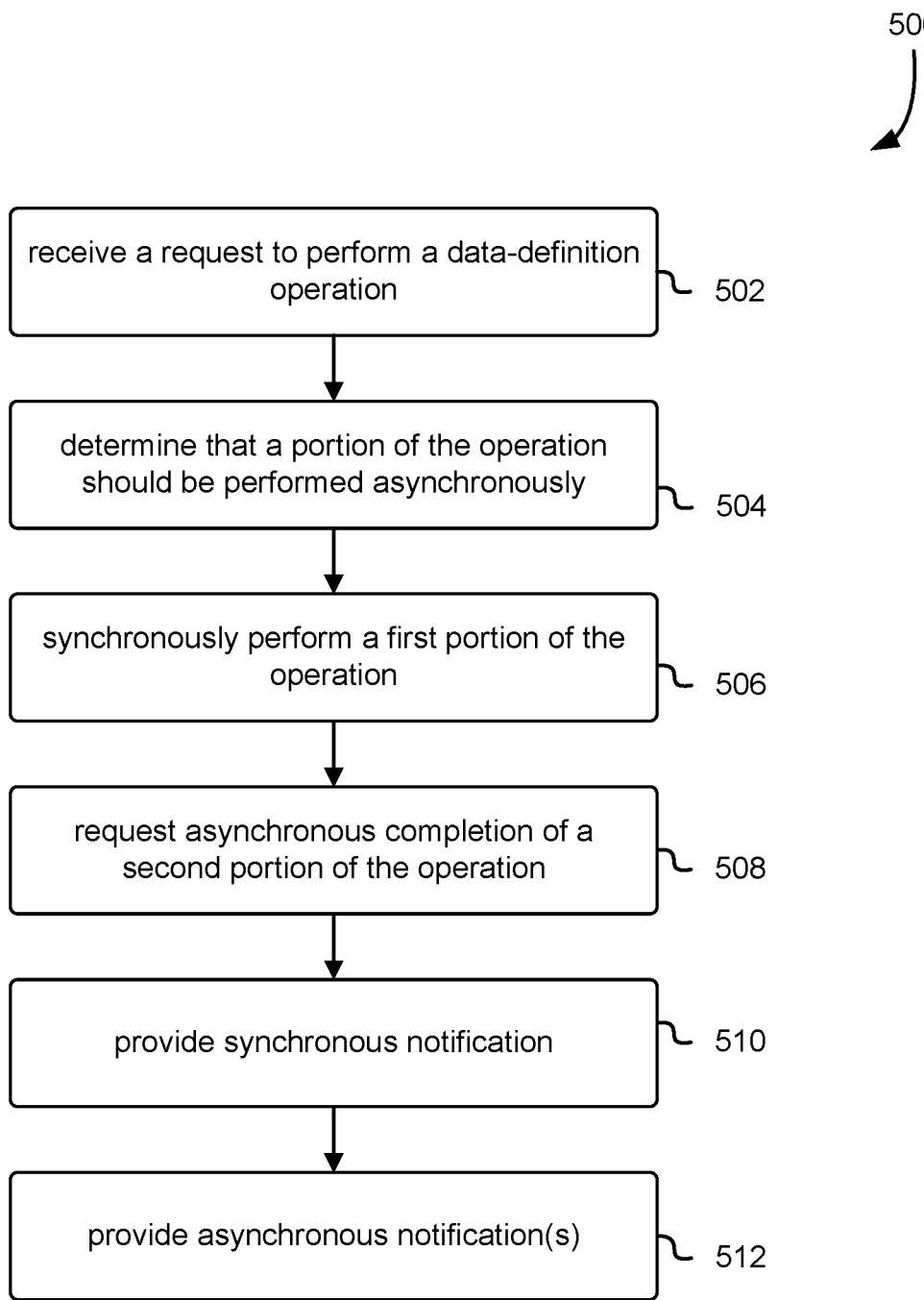
FIG. 5 illustrates an example of processing a request to perform a data definition operation, in accordance with at least one embodiment.

FIG. 5 illustrates an example of processing a request to perform a data definition operation, in accordance with at least one embodiment. Although FIG. 5 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 500 may be embodied in any of a variety of systems, including but not limited to the database system 100 depicted in FIG. 1.

At 502, the database system receives a request to perform a data definition operation. The request may, for example, come from a client process, such as the client 102 depicted in FIG. 1, initiated by the database system itself, or come from some other source.

At 504, the database system determines that a portion of the operation should be performed asynchronously. This step may be omitted, and certain sub-operations may be preconfigured to be performed synchronously, while other sub-operations may be pre-configured to be performed asynchronously. However, in other embodiments, the determination is made dynamically. In some embodiments, operations that are considered short-running or low-risk may be performed via synchronous sub-operations, and other operations (e.g., long-running operations or operations with higher risk) performed asynchronously. This determination may, for example, be determined dynamically based on current resource availability, the amount of resources affected by an operation, or other factors.

At 506, the database system performs a first portion of the operation synchronously, in accordance with predetermined or dynamic determinations regarding which sub-operations should be performed synchronously, and which should be performed asynchronously.

At 508, the database system requests that a second portion of the operation be completed asynchronously. This too is done in accordance with predetermined or dynamic determinations regarding which sub-operations should be performed synchronously, and which should be performed asynchronously.

At 510, the database system provides synchronous notification of the data definition operation. For example, in at least one embodiment, the database system provides a client with a notification, in response to the client's request to perform a data definition operation, that the synchronous portion of the operation has completed. The indication may, in some embodiments, provide information permitting the client to subsequently inquire as to the status of the asynchronous portion.

At 512, the database system provides asynchronous notification(s) related to the status of the remaining portions. This can be done through any of a variety of mechanisms, including callbacks, queries, and transmissions. In at least one embodiment, a database schema entry corresponding to a modified structure is updated to reflect the completion status of the asynchronous sub-operations.

Figure 6:
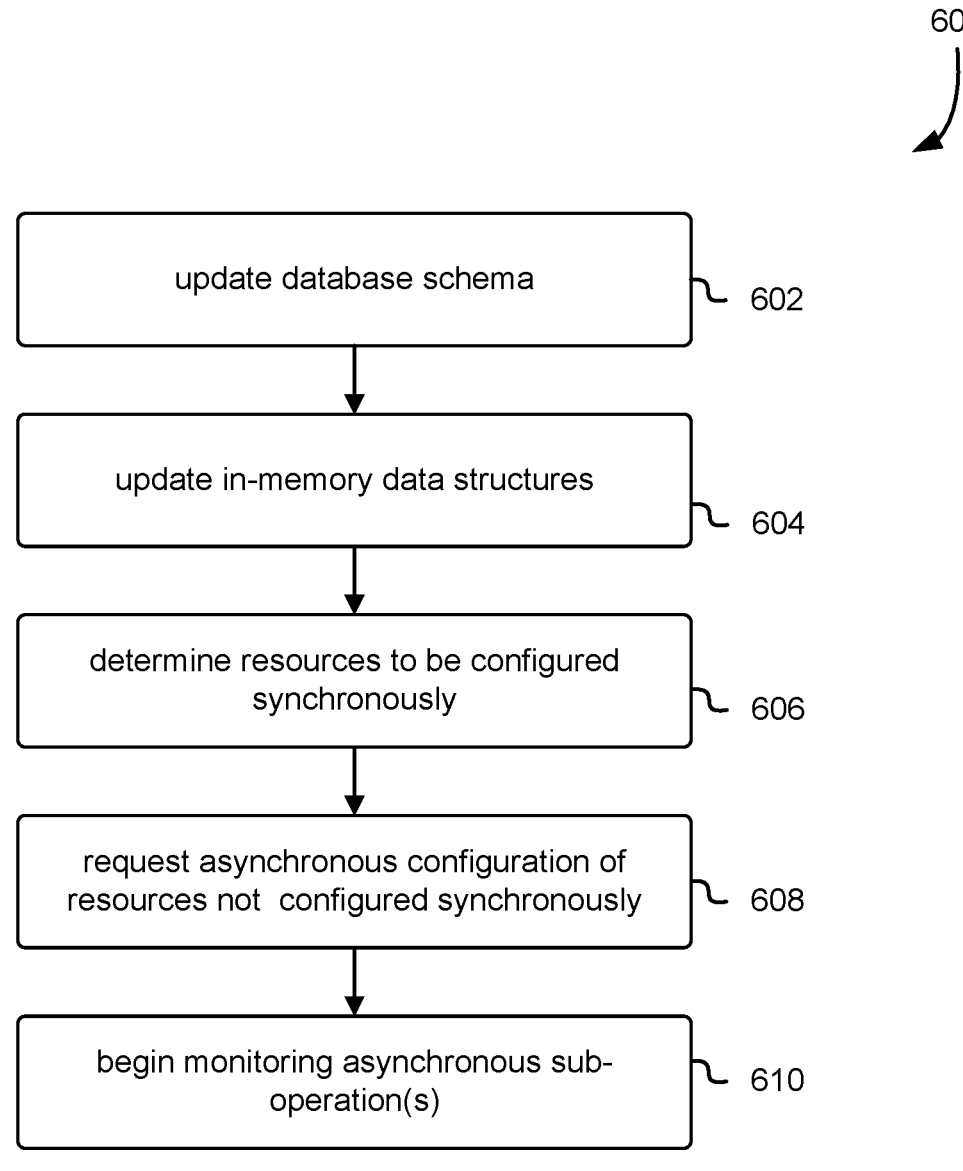
FIG. 6 illustrates an example of synchronous processing of a data definition operation, in accordance with at least one embodiment.

FIG. 6 illustrates an example of synchronous processing of a data definition operation, in accordance with at least one embodiment. Although FIG. 6 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 600 may be embodied in any of a variety of systems, including but not limited to the database system 100 depicted in FIG. 1.

At 602, the database system updates the database schema, in accordance with a data definition operation. This is done synchronously, such that sub-operations to update the database schema are completed prior to the database system making its initial response, e.g., to a client, regarding the data definition operation. The updates to the database schema could include any of various changes, as appropriate for the request. These changes could, for example, comprise adding a description of a table, adding a column to the description of an existing table, removing a column from a description of an existing table, deleting a description of a table, adding a description of a view, modifying the location or characteristics of storage media used to store data for a table, and so on. Similarly, at 604, the database system updates in-memory data structures that might also need updating to reflect the data definition operation. These operations are typically suitable for synchronous processing since they can be completed relatively quickly, and with relatively little risk of failure.

At 606, the database system determines resources to be configured synchronously. Resource configuration sub-operations often involve long latencies or increased risk of failure. However, some of these sub-operations might still be performed synchronously, if they can be completed within some threshold amount of time, or under some threshold amount of risk. In at least one embodiment, resources are synchronously configured up to the point that the defined database structure becomes usable when the system first responds to a client regarding the data definition operation, and the remaining resources are configured asynchronously. The amount of resources configured synchronously may likewise be determined based on latency and/or risk. For example, if a data definition operation requires additional space, and only 25% of that space is immediately available, the database system might allocate the 25% synchronously and the remaining amount asynchronously. The initial portion, already available, can be allocated quickly and with low-risk, while the remaining 75% might require lengthier or higher-risk operations.

At 608, the database system requests asynchronous configuration of resources that were not configured synchronously. In at least one embodiment, all resource configuration for a given resource type is done asynchronously, such as all resource configuration associated with storage media. In at least one embodiment, a database engine requests that a resource configuration sub-operation be performed by a storage engine, for example as depicted in FIG. 1.

At 610, the database system begins monitoring asynchronous sub-operations. In at least one embodiment, an agent or other monitoring process is started by the database system. The agent then periodically checks to see if the asynchronous sub-operations have completed, and if so, notifies the client or other processes that might be dependent on the operation being fully completed.

FIG. 7 illustrates an example of asynchronous processing of resource configuration, in accordance with at least one embodiment. Although FIG. 7 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 700 may be embodied in any of a variety of systems, including but not limited to the database system 100 depicted in FIG. 1. In some embodiments, these steps are performed by a remote system, such as by a remote storage engine.

At 702, the system receives a request to asynchronously configure resources. The resources may be those needed to asynchronously complete processing of a data definition operation, as determined by a database engine. The impacted resource could include storage resources, such as storage space that needs to be allocated or formatted. Other resource types, such as compute and network capacity, may be involved instead of or in addition to At 704, the system configures a portion of the requested resources. The portion may depend on a variety of factors, such as the amount of resource affected, the availability of those resources, how additional resources are acquired, and so on. In some cases, all of the requested resources may be configured at once, or the resources may be configured in smaller portions.

At 706, the system provides asynchronous notification of the status of the allocation. Then, at 708, the system determines if all impacted resources have been configured in accordance with the request received at 702. If so, the process ends at 710. Otherwise, the process repeats at 704.

FIG. 8 illustrates an example of processing a data definition operation, in accordance with at least one embodiment. Although FIG. 8 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 800 may be embodied in any of a variety of systems, including but not limited to the database system 100 depicted in FIG. 1.

At 802, the system receives a request to perform a data definition operation. As described herein, for example in relation to FIG. 1, the request may comprise a DDL command using SQL syntax to describe instructions for creating, modifying, or deleting a table, index, view, or other database structure.

At 804, the system performs a synchronous sub-operation that comprises configuration of a structure of a database. The structure can include any of a variety of database objects, potentially including but not limited to tables, views, cubes, table spaces, catalogs, and so forth. The configuration of these structures can potentially include, but is not limited to, updates to a schema or data dictionary.

At 806, the system provides a notification that the synchronous sub-operation has completed successfully.

At 808, the system performs an asynchronous sub-operation comprising configuring storage associated with the structure of the database. These operations can include allocating or formatting space to be used by the associated structure, releasing space no longer needed for use in association with the structure, and so forth.

At 810, the system determines that the asynchronous sub-operation has completed, and provides a notification of the completion at 812.

As one skilled in the art will appreciate in light of this disclosure, certain embodiments may be capable of achieving certain advantages, including some or all of increased performance, reliability, or flexibility. For example, in some embodiments asynchronous performance of data configuration operations allows database structures to be accessed more quickly after definition. In some embodiments, asynchronous performance of data configuration operations allows incorporation of any of a variety of error recovery techniques that would not be possible or practical for fully synchronous performance of a DDL command.

In another example, a computer-implement method for performing data definition operations on a database comprises receiving a request to perform a data definition operation on a database; performing a synchronous sub-operation comprising configuring a database structure; providing an indication that the synchronous sub-operation has completed; and performing an asynchronous sub-operation comprising configuring storage associated with the database structure.

In a further aspect of this example, the request may comprise a data definition language statement indicative of least one of creating, modifying, or deleting the database structure. As described herein, the statement can be expressed as DDL using, for example, SQL language syntax.

In a further aspect of this example, the synchronous sub-operation may comprise updating a database schema in accordance with the data definition operation.

In a further aspect of this example, the synchronous sub-operation may be performed by a database engine, and the database engine may communicate with a storage engine to request completion of the asynchronous sub-operation.

In a further aspect of this example, the indication that the synchronous sub-operation has completed successfully can indicate that the database structure is usable by a client. For example, embodiments may allow a client to utilize a modified table before all of the associated storage configuration has been completed.

In a further aspect of this example, configuring storage can comprise at least one of increasing or decreasing an amount storage reserved for the database structure.

In a further aspect of this example the asynchronous sub-operation comprises interaction with one or more services remote to the database. This could be the case, for example, when storage space is provided by a cloud computing service, or when the database system comprises storage sub-systems at facilities that are remote to the database engine.

In a further aspect of this example, the synchronous sub-operation configures a first portion of storage associated with the database structure and the asynchronous sub-operation configures a second portion of the storage associated with the database structure. As described herein, some embodiments may perform initial allocations (or other storage-related operations) synchronously if those operations can be performed quickly, but defer more lengthy tasks to the asynchronous sub-operation.

In a further aspect of this example the synchronous sub-operation is performed by a database engine and the asynchronous operation is performed by a storage engine. For example, as described in relation to FIG. 1, the database engine and storage engine may be architecturally separated by an interface, through which the two subsystems communicate.

In a further aspect of this example, the method comprises determining a first set of sub-operations to perform synchronously and a second set of sub-operations to perform asynchronously, wherein the first and second sets of sub-operations are determined based, at least in part, on at least one of latency of a sub-operation or risk associated with the sub-operation.

Figure 9:
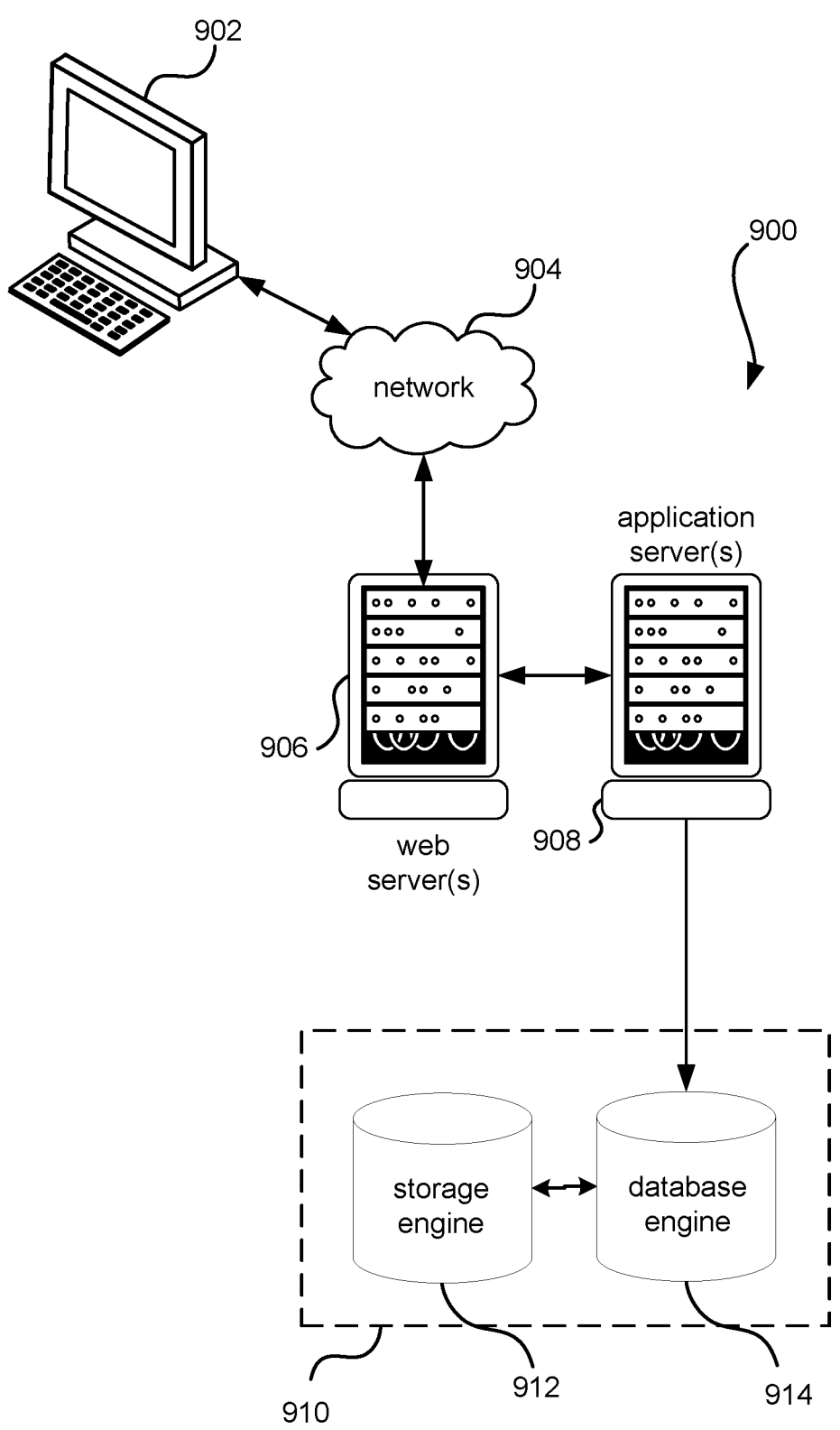
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a database 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database 910, in an embodiment, includes several separate data tables, databases, data documents, dynamic data storage schemes and/or other data storage mechanisms and media for storing data relating to a particular aspect of the present disclosure. The database 910 comprises a database engine 914 and storage engine 912, which may correspond to any of those described herein, including the database engine and storage engine described in relation to FIG. 1. In an embodiment, the database illustrated includes mechanisms for storing production data and user information, which may be used to serve content for the production side. The database may also include a mechanism for storing log data, which is used, in an embodiment, for reporting, computing resource management, analysis or other such purposes. In an embodiment, other aspects such as page image information and access rights information (e.g., access control policies or other encodings of permissions) are stored in the database in any of the above listed mechanisms as appropriate or in additional mechanisms in the database 910.

The database 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the database accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of databases and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The present disclosure may be further understood in view of the following clauses:

1. A system, comprising:
one or more processors;
memory to store computer-executable instructions that, in response to execution by the one or more processors, cause the one or more processors to:
receive a request to perform a data definition operation on a database;
perform a synchronous sub-operation of the data definition operation, the synchronous sub-operation comprising configuration of a database structure;
provide a first indication that the synchronous sub-operation has completed successfully;
perform an asynchronous sub-operation of the data definition operation, the asynchronous sub-operation comprising configuration of storage associated with the database structure; and
provide a second indication that the asynchronous sub-operation has completed.

2. The system of clause 1, wherein the data definition operation comprises at least one of creating, modifying, or deleting the database structure.

3. The system of clauses 1 or 2, wherein the configuration of storage comprises adjusting an amount storage reserved for storing data associated with the database structure.

4. The system of any of clauses 1-3, wherein the synchronous sub-operation is performed by a database engine, and wherein the database engine communicates with a storage engine to request completion of the asynchronous sub-operation.

5. The system of any of clauses 1-4, wherein the configuration of the database structure comprises storing schema information comprising a definition of the database structure.

6. A computer-implemented method, comprising:

receiving a request to perform a data definition operation on a database;

performing a synchronous sub-operation comprising configuring a database structure;

providing an indication that the synchronous sub-operation has completed; and performing an asynchronous sub-operation comprising configuring storage associated with the database structure.

7. The method of clause 6, wherein the request comprises a data definition language statement indicative of least one of creating, modifying, or deleting the database structure.

8. The method of clauses 6 or 7, wherein the synchronous sub-operation comprises updating a database schema in accordance with the data definition operation.

9. The method of any of clauses 6-8, wherein the indication that the synchronous sub-operation has completed successfully indicates that the database structure is usable by a client.

10. The method of any of clauses 6-9, wherein the configuring storage comprises at least one of increasing or decreasing an amount storage reserved for the database structure.

11. The method of any of clauses 6-10, wherein the synchronous sub-operation is performed by a database engine, and wherein the database engine communicates with a storage engine to request completion of the asynchronous sub-operation.

12. The method of any of clauses 6-11, wherein the asynchronous sub-operation comprises interaction with one or more services remote to the database.

13. The system of any of clauses 1-12, wherein the synchronous sub-operation configures a first portion of storage associated with the database structure and the asynchronous sub-operation configures a second portion of the storage associated with the database structure.

14. A non-transitory computer-readable storage medium storing thereon executable instructions that, as a result of being executed by one or more processors of a computer system, cause the computer system to at least:

receive a request to perform a data definition operation on a database;

perform a synchronous sub-operation comprising configuration of a database structure;

provide an indication that the synchronous sub-operation has completed; and perform an asynchronous sub-operation comprising configuration of storage associated with the structure of the database.

15. The non-transitory computer-readable storage medium of clause 14, wherein the configuration of the database structure comprises updating a database schema in accordance with the data definition operation.

16. The non-transitory computer-readable storage medium of clauses 14 or 15, wherein the instructions further comprise instructions that, as a result of being executed by the one or more processors, cause the computer system to:

indicate that the database structure is usable prior to completion of the asynchronous sub-operation.

17. The non-transitory computer-readable storage medium of any of clauses 14-16, wherein the configuration of storage comprises adjusting an amount storage reserved for storing data associated with the database structure.

18. The non-transitory computer-readable storage medium of any of clauses 14-17, wherein the synchronous sub-operation is performed by a database engine and the asynchronous operation is performed by a storage engine.

19. The non-transitory computer-readable storage medium of any of clauses 14-18, wherein the instructions further comprise instructions that, as a result of being executed by the one or more processors, cause the computer system to:

determine a first set of sub-operations to perform synchronously and a second set of sub-operations to perform asynchronously, wherein the first and second sets of sub-operations are determined based, at least in part, on at least one of latency of a sub-operation or risk associated with the sub-operation.

20. The non-transitory computer-readable storage medium of any of clauses 14-19, wherein the instructions further comprise instructions that, as a result of being executed by the one or more processors, cause the computer system to:

complete a first portion of the configuration of storage as part of the synchronous sub-operation; and complete a second portion of the configuration of storage as part of the asynchronous sub-operation.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors;
memory to store computer-executable instructions that, in response to execution by the one or more processors, cause the one or more processors to:
receive a request to perform a data definition operation to be performed using a synchronous sub-operation and an asynchronous sub-operation on a database;
perform the synchronous sub-operation of the data definition operation, the synchronous sub-operation comprising configuration of a database structure indicated by the data definition operation;

provide a first indication that the synchronous sub-operation has completed successfully and that one or more operations associated with the database structure can be performed irrespective of completion of the asynchronous sub-operation of the data definition operation;

perform the asynchronous sub-operation of the data definition operation, the asynchronous sub-operation comprising configuration of storage associated with the database structure, the configuration made in accordance with instructions of the data definition operation; and provide a second indication that the asynchronous sub-operation of the data definition operation has completed.

2. The system of claim 1, wherein the data definition operation comprises at least one of creating, modifying, or deleting the database structure.

3. The system of claim 1, wherein the configuration of storage comprises adjusting an amount of storage reserved for storing data associated with the database structure.

4. The system of claim 1, wherein the synchronous sub-operation is performed by a database engine, and wherein the database engine causes a storage engine to perform the asynchronous sub-operation.

5. The system of claim 1, wherein the configuration of the database structure comprises storing schema information comprising a definition of the database structure.

6. A computer-implemented method, comprising:

receiving a request to perform a data definition operation to comprise a synchronous sub-operation and an asynchronous sub-operation on a database;

performing the synchronous sub-operation comprising configuring a database structure indicated by the data definition operation;

providing an indication that the synchronous sub-operation has completed and that one or more operations associated with the database structure can be performed; and performing the asynchronous sub-operation comprising configuring storage associated with the database structure, wherein the configuration of the storage is in accordance with the data definition operation.

7. The method of claim 6, wherein the request comprises a data definition language statement indicative of at least one of creating, modifying, or deleting the database structure.

8. The method of claim 6, wherein the synchronous sub-operation comprises updating a database schema in accordance with the data definition operation.

9. The method of claim 6, wherein the indication that the synchronous sub-operation has completed successfully indicates that the database structure is usable by a client.

10. The method of claim 6, wherein the configuration of the storage comprises at least one of increasing or decreasing an amount of storage reserved for the database structure.

11. The method of claim 6, wherein the synchronous sub-operation is performed by a database engine, and wherein the database engine requests that a storage engine perform the asynchronous sub-operation.

12. The method of claim 6, wherein the asynchronous sub-operation comprises interaction with one or more services remote to the database.

13. The method of claim 6, wherein the synchronous sub-operation configures a first portion of storage associated with the database structure and the asynchronous sub-operation configures a second portion of the storage associated with the database structure.

14. A non-transitory computer-readable storage medium storing thereon executable instructions that, as a result of being executed by one or more processors of a computer system, cause the computer system to at least:

receive a request to perform a data definition operation comprising a synchronous sub-operation on a database and an asynchronous sub-operation on the database;

perform the synchronous sub-operation comprising configuration of a database structure whose configuration is indicated by the data definition operation;

provide an indication that the synchronous sub-operation has completed, the indication indicating and that the database structure can be used to perform operations; and perform the asynchronous sub-operation comprising configuration of storage associated with the database structure, the configuration in accordance with instructions indicated by the data definition operation.

15. The non-transitory computer-readable storage medium of claim 14, wherein the configuration of the database structure comprises updating a data dictionary in accordance with the data definition operation.

16. The non-transitory computer-readable storage medium of claim 14, wherein the instructions further comprise instructions that, as a result of being executed by the one or more processors, cause the computer system to:

indicate that the database structure is usable prior to completion of the asynchronous sub-operation.

17. The non-transitory computer-readable storage medium of claim 14, wherein the configuration of storage comprises adjusting an amount storage reserved for storing data associated with the database structure.

18. The non-transitory computer-readable storage medium of claim 14, wherein the synchronous sub-operation is performed by a database engine and the asynchronous operation is performed by a storage engine.

19. The non-transitory computer-readable storage medium of claim 14, wherein the instructions further comprise instructions that, as a result of being executed by the one or more processors, cause the computer system to:

determine a first set of sub-operations to perform synchronously and a second set of sub-operations to perform asynchronously, wherein the first and second sets of sub-operations are determined based, at least in part, on at least one of latency of a sub-operation or risk associated with the sub-operation.

20. The non-transitory computer-readable storage medium of claim 14, wherein the instructions further comprise instructions that, as a result of being executed by the one or more processors, cause the computer system to:

complete a first portion of the configuration of storage as part of the synchronous sub-operation; and complete a second portion of the configuration of storage as part of the asynchronous sub-operation.

* * * * *